Nov. 6, 1962
P. R. NEWCOMB
3,062,014
UNDERWATER DRILLING APPARATUS
Filed Sept. 14, 1959
5 Sheets-Sheet 1
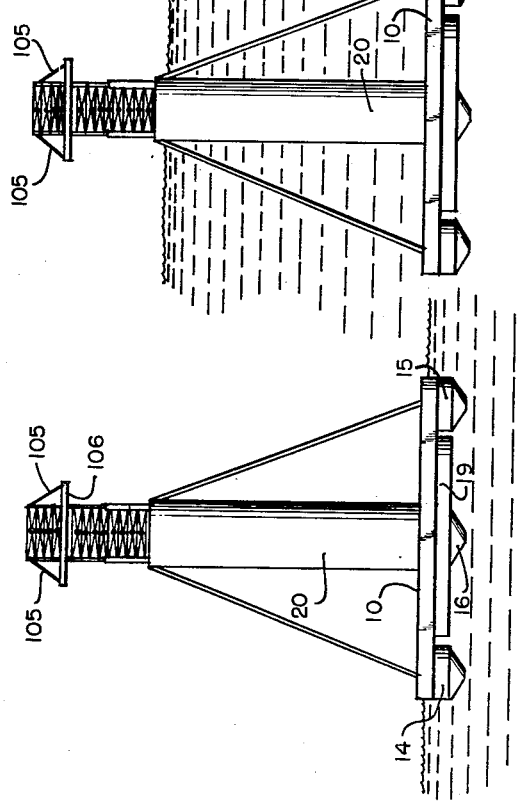
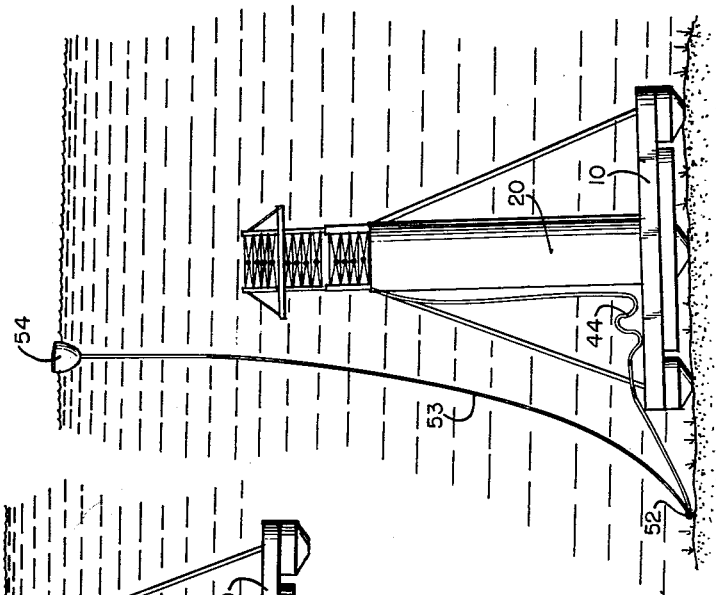
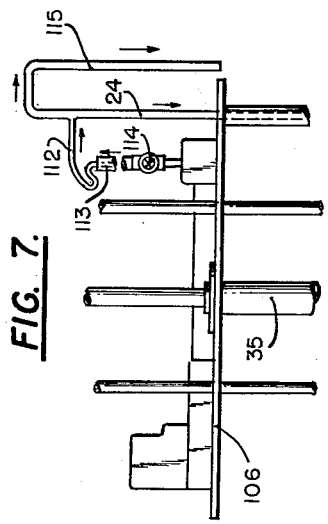
INVENTOR
Paul R. Newcomb
BY *Moore & Hall*
ATTORNEYS Nov. 6, 1962 P. R. NEWCOMB 3,062,014
UNDERWATER DRILLING APPARATUS
Filed Sept. 14, 1959 5 Sheets-Sheet 2

INVENTOR
Paul R. Newcomb

BY *Moore & Hall*

ATTORNEYS

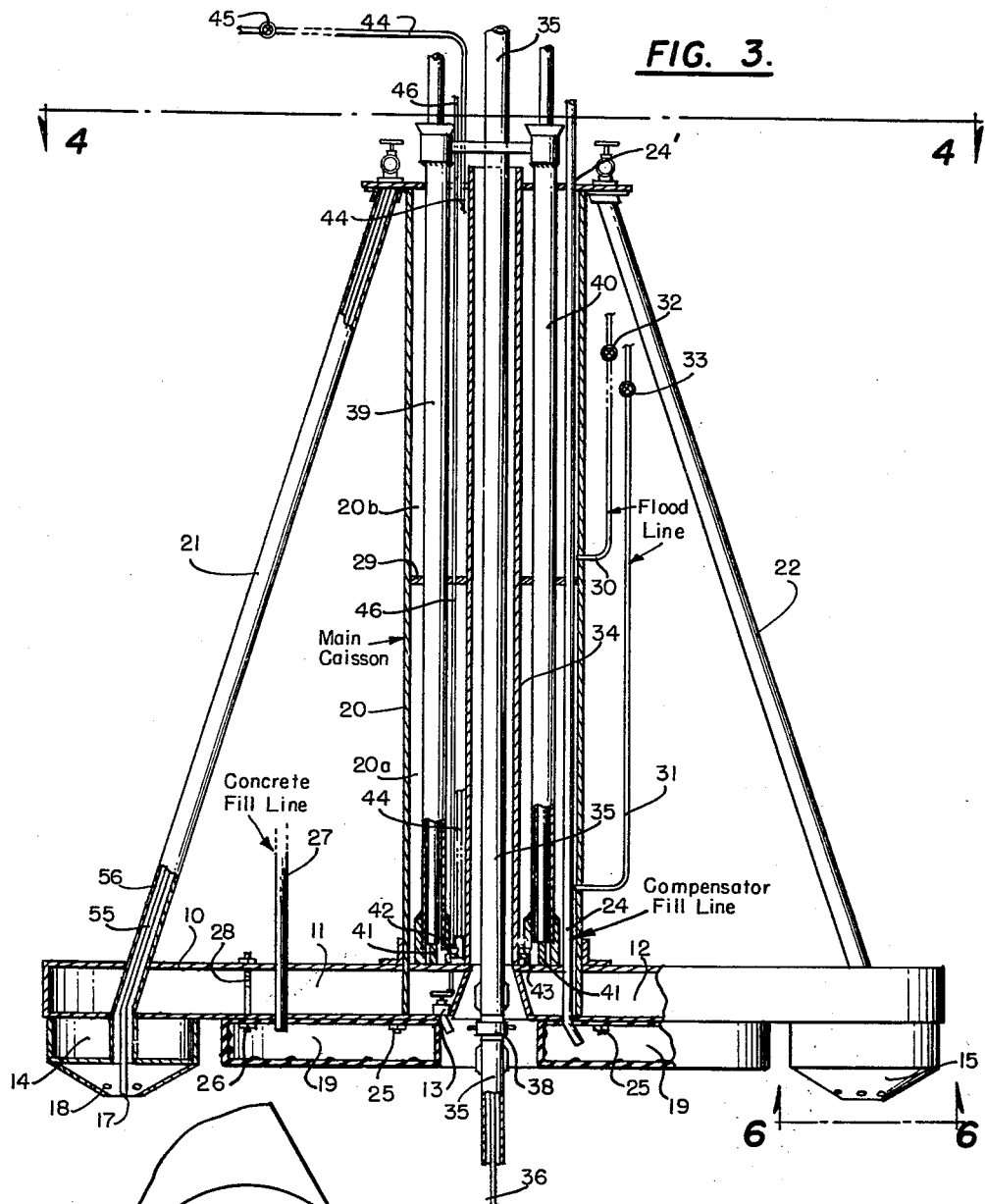
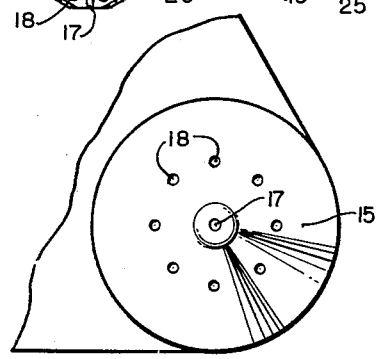

INVENTOR
Paul R. Newcomb
BY *Moore & Hall*
ATTORNEYS

Nov. 6, 1962 P. R. NEWCOMB 3,062,014
UNDERWATER DRILLING APPARATUS
Filed Sept. 14, 1959 5 Sheets-Sheet 5
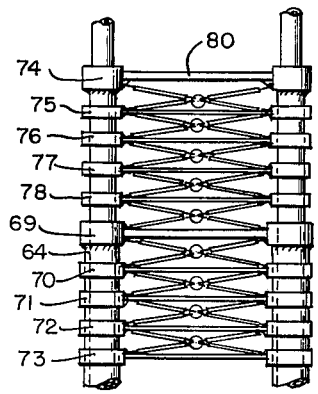
FIG. 8A.
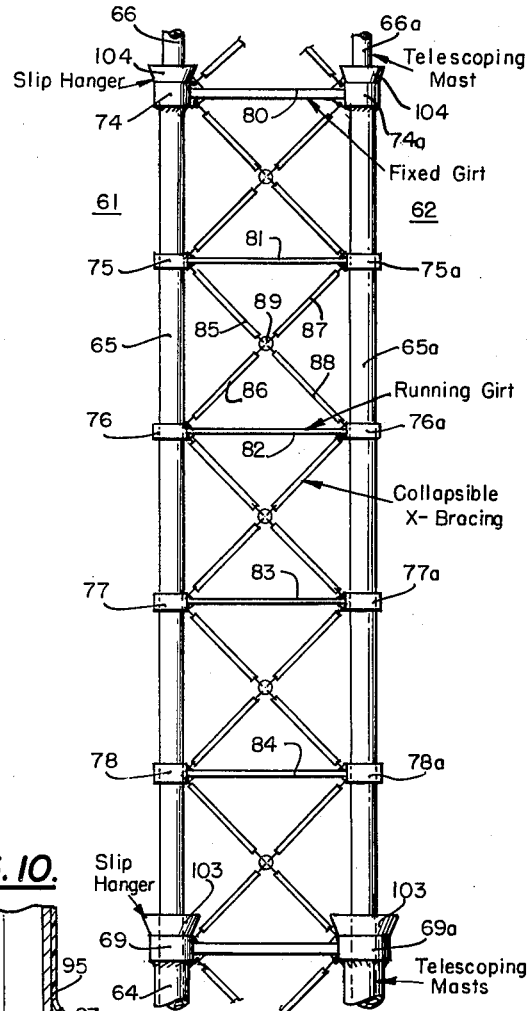
FIG. 8B.
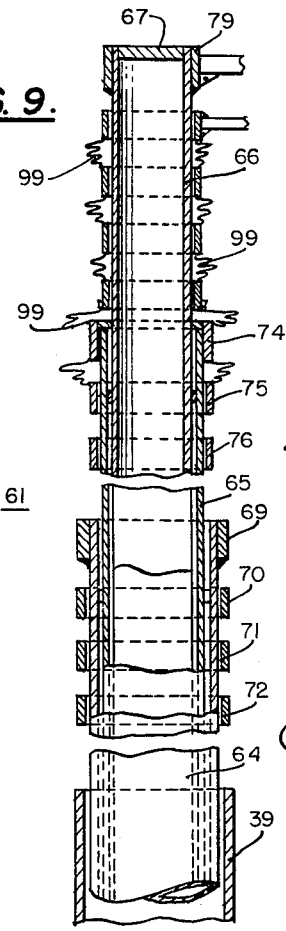
FIG. 9.
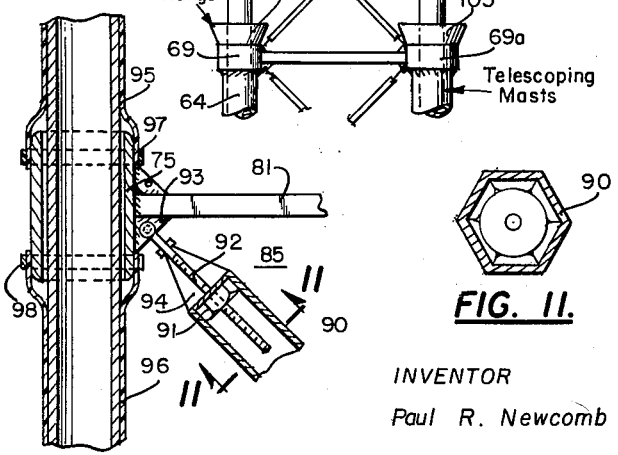
FIG. 10.
FIG. 11.
INVENTOR
Paul R. Newcomb
BY
ATTORNEYS

United States Patent Office 3,062,014
Patented Nov. 6, 1962

3,062,014
UNDERWATER DRILLING APPARATUS
Paul R. Newcomb, Silver Spring, Md.
(4327 Lower River Road, Youngstown, N.Y.)
Filed Sept. 14, 1959, Ser. No. 839,776
13 Claims. (Cl. 61—46.5)

The present invention relates to a method and portable apparatus for effecting underwater drilling operations such as may be desired in the drilling of oil and gas wells and/or in various seismic and geologic exploration; and is more particularly concerned with an apparatus as well as modes of operating the same for effecting underwater drilling at less expense and with greater efficiency than has been possible heretofore.

Various structures have been suggested heretofore comprising off-shore marine platforms adapted for various uses, the most important of which at the present time comprise drilling for oil and gas. These platforms are often portable in nature whereby they may be towed to a desired drilling location and thereafter sunk and anchored in place. In practice, it has been found that all such apparatuses suggested heretofore have necessarily taken the form of relatively massive structures consisting of base members and superstructures constructed of steel and concrete in conjunction with other structural materials; and the actual mechanical configuration and materials employed in such devices heretofore has been necessarily such as to provide a platform having sufficient strength, augmented by appropriate safety factors, to enable the platform to remain fixed under the worst of sea conditions.

In this latter regard, it has been well known heretofore that a major factor in determining the configuration and structural strength required of marine or off-shore drilling platforms has been the existence of upsetting moments due to wave action. The considerable forces which can be exerted by such wave action and various theoretical factors normally considered in determining the effects of wave action, are set forth in some detail in U.S. Patent No. 2,382,763, issued August 14, 1945, to G. L. Young, for: "Submarine Foundation;" and it is normal practice in designing marine platforms at the present time to take into consideration the maximum forces which might occur, due to prevalent storm and wave action conditions, and thereafter to provide a structure of sufficient strength and safety factor to resist these forces.

The result of the foregoing considerations is that marine platforms presently employed are extremely expensive, comprising as they do very massive structures. This in turn considerably increases the cost of geophysical exploration and drilling; and in addition considerably decreases the portability of the overall device, thereby requiring that so-called "portable" structures suggested heretofore are actually in effect almost permanent structures once located and rigged.

The present invention, recognizing these disadvantages of marine platforms utilized heretofore, is concerned with a structure which lends itself to less expensive manufacture and greater facility of operation and transportation than has been possible heretofore. In particular, the present invention contemplates the provision of a portable marine platform which is so constructed as to be collapsible under appropriate hydraulic controls, thereby to permit the device to be readily towed and sunk at a desired location for drilling operations; and said platform is adapted further to be temporarily submerged beneath the level of effective wave action in heavy weather whereby the structure is designed to avoid or evade rather than simply resist upsetting moments which might occur in such heavy weather. By the arrangement to be described hereinafter, therefore, the present invention may be of considerably lighter and less expensive construction and of far greater portability than has been possible heretofore.

It is accordingly an object of the present invention to provide an improved method and apparatus for erecting a deep water submersible offshore platform.

Another object of the present invention resides in the provision of a structure readily portable in nature and adapted for offshore drilling operations; with said structure being so arranged that it may be readily converted to a permanently based platform, as may be desired.

A further object of the present invention resides in the provision of an offshore drilling platform which is considerably lighter and less expensive to construct and maintain, and which exhibits far greater portability and versatility of use than has been possible heretofore.

Another object of the present invention resides in the provision of an offshore drilling platform having a novel base or foundation adapted to fully conform to the underlying ocean floor.

A still further object of the present invention resides in the provision of an offshore drilling platform comprising a superstructure which is collapsible in nature, whereby the platform may be submerged considerably below the surface of water in which drilling is taking place and, particularly, submerged beneath the level of effective wave action in heavy weather, thereby to permit said apparatus to avoid destructive or upsetting moments occasioned by wave action.

Still another object of the present invention resides in the provision of an apparatus adapted to be sunk at a desired drilling location, in conjunction with means for effectively positioning and levelling the device on an ocean floor and in conjunction with further means adapted to resist variable loads which may be imposed on the overall structure during drilling operations and other operations attendant thereto.

A still further object of the present invention resides in the provision of a portable, submersible, offshore drilling platform, so constructed as to have the various parts thereo, as well as equipment carried thereby, secured against corrosive effects due to salt water.

In providing for the foregoing objects and advantages, the present invention contemplates the provision of a portable barge tended marine platform adapted for erection in waters having a mean depth in the order of fifty to 300 feet, on sand, hard mud, or gravel bottoms, wherein the bearing strength of the effective surface bottom sediments are in the order of 500 lbs./square foot or greater. The platform to be described hereinafter is designed for use in drilling to producing depths of 1,000 to 15,000 feet, and even deeper if slim holes are drilled; and is structurally designed to be employed as a drilling platform in prevailing water currents up to 1.5 knots, and in prevailing winds up to 35 knots with wind gusts up to 50 knots.

It will be appreciated from these figures that the apparatus is actually designed to work in moderate wind and sea conditions; but the structure is such that the device can nevertheless remain erected, in standby condition, in prevailing winds of 35 to 50 knots and in gusts of even higher velocity (as well as in the wave action resulting from such wind velocities). Under these conditions of heavier weather, i.e. under conditions of heavy wave action due to sustained winds in excess of 50 knots, the equipment is designed to be dropped or submerged below the level of effective wave action so that the entire structure can avoid or evade rather than merely resist moments due to such wave action; and by this operation, it has been found that the structural strength of the steel which need be employed in the apparatus of the present invention can be reduced to from 5% to 20% of that used in current offshore rigs, with a savings in steel of at least 80%.

The apparatus itself comprises a barge of generally triangular shape having a steel skin enclosing fillable tanks therein, whereby said barge is adapted to be floated to a desired position and thereafter flooded for submersion. The barge is adapted to carry and support a central caisson similar to the caisson shown in Voorhees Patent No. 2,187,871, issued January 23, 1940, for: "Underwater Drilling;" and this central caisson also contains one or more tanks adapted to be variably flooded to control the buoyancy of the overall apparatus.

The centrally located barge and caisson further cooperate with an extensible mast structure adapted to be raised and lowered hydraulically, and comprising a plurality of telescoping extensible masts extending from and above the central caisson. Collapsible X-bracing, associated with running and fixed girts, interconnects the several telescoping masts whereby the platform superstructure, comprising said masts and bracing above said caisson, may be extended as desired, to provide a superstructure varying in height between 30 and 250 feet or more above the top of the central caisson. This extensible superstructure is in turn designed to support a working platform for personnel; and said superstructure and platform further support apparatus necessary in drilling and attendant operations, including conventional draw-works, engines, crown and travelling blocks, deadline spool, rotary table, pipe, etc. The arrangement is further such that said equipment or apparatus may be removed to the tender and/or appropriately secured for heavy weather and sealed within oil filled enclosures or the like, when it is desired to submerge the superstructure and equipment below effective wave action in heavy seas.

The triangular barge of the platform structure, mentioned previously, is further associated with a plurality of auxiliary caissons taking the form of jet fleet located at the apices thereof, and adapted to have fluid under pressure pumped therethrough for selectively eroding portions of the sea bottom to level the overall apparatus. The central portion of the barge further includes, on its undersurface, a novel foundation structure comprising an enlarged flexible supporting structure, preferably toroidal in shape, containing fluid, preferably at varying and controllable pressures, to provide a large area base readily and fully conforming to and resting upon the ocean floor to give the structure high stability and to increase the bearing surface. This toroidal, or other shaped, supporting structure is further adapted to be filled with concrete when it is desired to provide a firmer permanent or semipermanent base for the overall structure during extended drilling operations.

The apparatus itself may be towed as a spar buoy at a speed in the order of 1½ knots, and may in fact be towed as a barge at a speed in the order to three knots. Upon reaching a desired drilling location, the barge and caisson tanks may be selectively flooded, and the overall structure lowered to the sea bottom, with the various portions of the superstructure and equipment on the rig being fully protected from salt water during such submersion. When so submerged, hydraulic pressure applied to the aforementioned extensible or telescoping masts partially or fully raises the superstructure above the water level whereafter the device may be levelled through use of the jet feed mentioned previously. Equipment may thereafter be appropriately positioned on the working platform and elsewhere, and drilling operations may be conducted.

The device is normally operated in association with a tender having various pumps, fluid lines, etc., to be described hereinafter, for raising and lowering the superstructure and for otherwise controlling drilling operations. This tender also carries adequate oceanographic instrumentation, consisting of, for example, anemometers, barometers, etc. cooperating with other instrumentation preferably mounted on the drilling platform itself, e.g. velocity meters, and wave measuring devices, all adapted to aid in a determination of when and how deep the superstructure should be submerged. In conditions of heavy weather, and when a determination of the type mentioned has been made, the equipment on the superstructure and working platform is adapted to be secured and protected from the elements and sea water, whereafter the superstructure may be hydraulically lowered to a desired depth below the level of effective wave action, awaiting a decrease in wave action. The structure is so constructed that this securing of equipment and lowering of the entire superstructure can be effected within a period of time less than two hours, which is normally more than adequate when a storm is impending. After the storm has passed, the superstructure can be raised and drilling operations recommenced.

The foregoing objects, advantages, construction and operation of the present invention will become more readily apparent from the following description and accompanying drawings in which:

FIGURE 1A illustrates the apparatus of the present invention before submersion.

FIGURE 1B illustrates the apparatus of the present invention in a partially submerged condition.

FIGURE 1C illustrates the apparatus of the present invention in a fully submerged condition prior to extension of the superstructure and prior to levelling operations.

FIGURE 3 is a detail view in partial section showing the base and central caisson structure of the present invention.

Figure 4:
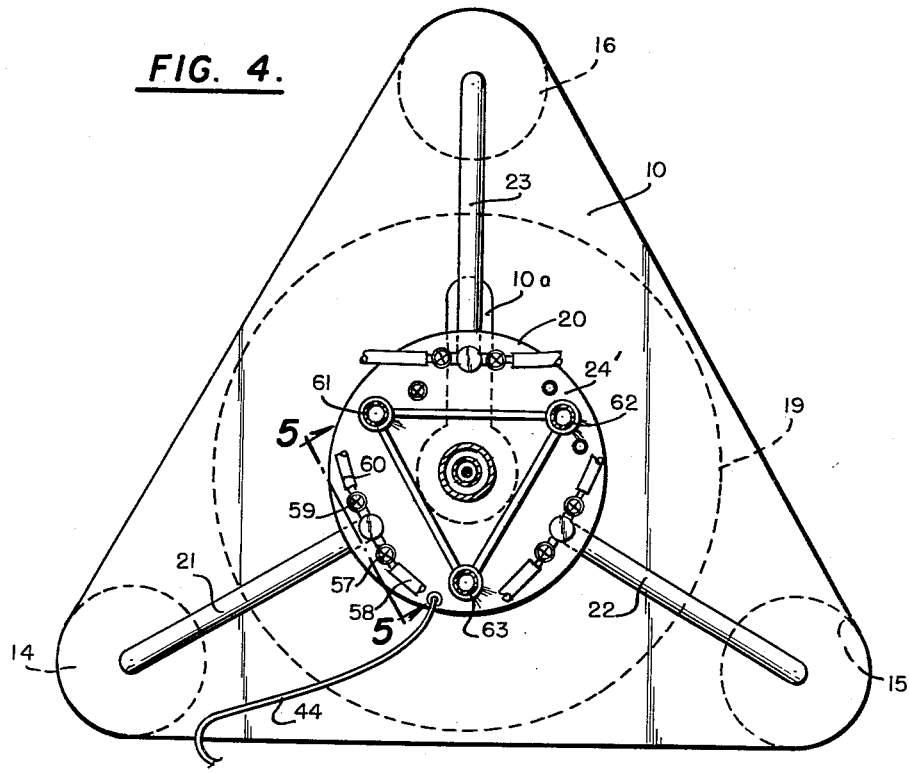
Figure 5:
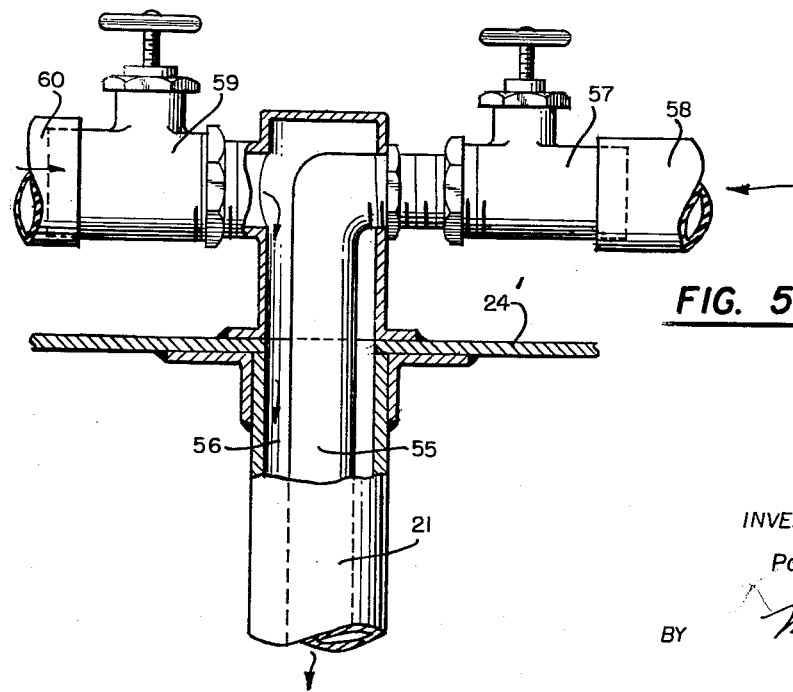

FIGURE 4 is a view taken on line 4—4 of FIGURE 3.
FIGURE 5 is a view taken on line 5—5 of FIGURE 4.
FIGURE 6 is a view taken on line 6—6 of FIGURE 3.

FIGURE 7 is an illustrative view of the working platform showing in particular the apparatus for controlling hydraulic pressure in the resilient base structure of the present invention.

FIGURE 8A is a detail view of a portion of the collapsible superstructure in a collapsed position.

FIGURE 8B is a detail view showing a portion of the collapsible superstructure of the present invention extended position.

FIGURE 9 is a detail view of the telescoping mast arrangement employed in the present invention.

FIGURE 10 is a detail view of the collapsible bracing structure employed in the present invention; and FIGURE 11 is a view taken on line 11—11 of FIGURE 10.

Referring now to the several figures, like numerals of which refer to like parts throughout, it will be seen that the portable platform of the present invention comprises a steel barge 10 which is of generally triangular configuration (see FIGURE 4), having a dimension in the order of 70 feet on each side thereof. Barge 10 defines a plurality of hollow tanks such as 11, 12 (see FIGURE 3) adapted to be selectively flooded by means such as a valve 13, and adapted also to be selectively emptied, e.g. by the aplication of apropriate air pressure, when it is desired to float the entire structure on the surface of a body of water. Steel barge 10 supports on its underside three jet feet structures 14, 15, 16 located respectively at the apices of the barge, with each such jet foot being of generally cylindrical shape and having a truncated conical bottom defining a central jet opening 17 and a circular locus of jet openings 18 adapted to eject water under pressure during levelling operations, to be described.

Barge 10 further carries on its lower side a resilient base structure or hydraulic compensator 19, preferably taking the form of a large torus constructed of reinforced rubber or fouling resistant plastic material; with said torus, or other shaped resilient structure exhibiting an outside diameter in the order of 42 feet to provide a large base fully conforming to the ocean bottom during actual drilling operations. While subsequent discussion will refer to element 19 as "toroidal" in shape, it will be appreciated that this term is meant to encompass a shape or shapes deviating from exact toroids, including planar sided figures. Moreover, other shapes or combinations of shapes cna be employed provided the basic purposes of the structure are satisfied.

The upper side of barge 10 (see FIGURE 3) further supports an enlarged central or main caisson 20 as well as three main tubular support members 21, 22 and 23, extending diagonally from the caisson head 24' to the barge 10 in the region of the several jet feet 14 through 16; and these support members 21 through 23 (in conjunction with other bracing structures, not shown, which may also be provided) are adapted to provide structural rigidity to the overall base section, and are adapted further to act as hydraulic supply lines for feeding jets of fluid to the several jet feet 14 through 16 during levelling operations.

The hydraulic compensator or resilient base structure 19, mentioned previously, is adapted to be supplied with fluid under pressure through a supply line 24 passing through the central caisson 20 and extending above said central caisson to a working platform 106, for purposes to be described hereinafter. In particular, means are provided for controlling the fluid pressure within hydraulic compensator 19 thereby to increase the resistive force between the ocean bottom and barge 10 when the load on the entire structure is increased, or when the collapsible superstructure is used for pipe pulling or hydraulic lifting operations, as will be described.

In normal practice, and during exploratory operations, the hydraulic compensator 19 is fully flexible so as to conform to the sea bottom, being held in place against the bottom of barge 10 by a pair of annular rings 25 and 26, prefabricated on the interior of the hydraulic compensator 19, and secured to the barge 10 by any appropriate fastening means. The hydraulic compensator 19, while normally having a fluid such as water therein, is further designed to be filled with concrete through the medium of a concrete fill line 27 passing through barge 10, as illustrated in FIGURE 3, it being understood that fill line 27 may, if desired, pass through the main caisson 20 rather than exterior thereto. Concrete fill line 27 is employed whenever it is desired to increase the rigidity of the base structure, e.g. when a permanent or semi-permanent rig is desired for extended drilling operations. Even after the hydraulic compensator 19 has been so filled with concrete, however, it may be desired upon occasion to transport the overall apparatus to another location; and for such purposes, the fastening means between the hydraulic compensator 19 and barge 10 should be such as to permit the concrete filled hydraulic compensator to be broken away from the remainder of the barge, thereby to permit such transportation of the rig. Such breakable fastening means have been illustrated in FIGURE 3 as nut and bolts 28; and when further flotation of the device is desired, the nuts may be broken away from the bolts by application of explosive, and the entire device thereafter lifted away from concrete filled hydraulic compensator 19 by application of air under pressure to the various tanks in the barge and central caisson which control buoyancy of the device. Fastening means other than nut and bolt arrangements, such as 28, will be apparent to those skilled in the art, and any such alternative fastening means may be provided, so long as the fastening means are breakable, for the purposes mentioned.

Central caisson 20 preferably defines an intermediate wall 29 acting to divide caisson 20 into two tanks of the type illustrated in Voorhees Patent No. 2,187,871, identified above. These two tanks are further associated with control lines 30 and 31 valved at 32 and 33 (located, for example, on the tender mentioned previously) to permit application of water or compressed air to the interior of the tanks 20a and 20b, located above and below central wall 29, whereby the buoyancy of the device may be variably controlled.

Central caisson 20 further contains on its interior a cylindrically shaped main guide section 34 through which casing 35 may pass for guiding lengths of drilling pipe 36 employed during various drilling and exploration techniques; and the casing 35 may also be associated with a gate valve 38 for purposes well known in the art. A hatchway 10a (see FIGURE 4) is provided in barge 10, with the interior sides thereof formed of appropriate sheet metal so as to maintain the desired sealing of tanks 11 and 12; and this hatchway 10a permits a diver to gain access to the gate valve 38 when necessary.

In addition to the foregoing, central caisson 20 encloses three mast guide cylinders, disposed in a triangular array conforming to the triangularly arrayed superstructure to be described hereinafter; and two of these mast guide cylinders are depicted in FIGURE 3 at 39 and 40. Each of the mast guide cylinders contains three concentrically disposed telescoping masts (to be described hereinafter in reference to FIGURE 9). The bottom of each mast guide cylinder 39, 40, etc., further includes a block 41 designed to prevent said telescoping masts from closing a fluid inlet fitting 42, 43, etc.; and each said fluid inlet fitting 42, 43, etc. is further connected to a hydraulic control line, one such line having been depicted at 44. The several hydraulic lines such as 44 pass upwardly through main caisson 20, and are adapted to extend from said caisson 20 to the tender associated with the overall equipment whereby fluid pressure may be selectively applied through a valve 45 to effect raising and lowering of the telescoping masts.

In order that the operation of the apparatus thus far described may be more fully appreciated, reference is first made to FIGURE 1A. This figure illustrates the apparatus as it would appear with the tanks in barge 10 and caisson 20 filled with air; and it will be noted that the overall device is highly buoyant whereby it may be towed by an appropriate tender to a desired drilling location. Upon arriving at such a drilling location, personnel on the barge 10 can open a fill valve such as 13 to flood the tanks in barge 10; and in this regard it will be noted that while valve 13 has been depicted in one location in FIGURE 3, the valve 13 may be located on the sides or bottom of the barge or at any other location permitting entry of water. Moreover it should be noted that valve 13 can be operated directly from the deck of barge 10; but in order to permit somewhat more remote control thereof, particularly when it is desired to use the valve as an exit opening for blowing water out of the tanks in barge 10, a remote control line 46 may be located within caisson 20 in communication with valve 13.

Once tanks 11 and 12 in barge 10 have been flooded, the buoyancy of the overall apparatus may be reduced to the point wherein the apparatus takes the partially submerged condition shown in FIGURE 1B. It should be noted that the overall apparatus may in fact be towed in this latter position (i.e. in the position shown in FIGURE 1B), and such a towing position may be desired due to the lower center of gravity exhibited by the entire device when the device is being towed in heavy seas. Indeed, the position shown in FIGURE 1B is the preferred towing position when the apparatus is to be transported relatively short distances within an established oil field, with the drilling equipment remaining on the apparatus during tow.

As a practical matter, it will be appreciated that the apparatus when first towed to a drilling site, preferably does not have drilling equipment or racked pipe thereon, and need not even have a working platform attached thereto, due to the lower center of gravity achieved through initial elimination of this equipment. Such equipment may be readily installed, when desired. On the other hand, equipment may be present on the rig when the rig is being transported from one drilling site to another. Such equipment is preferably secured for protection against the corrosive effects of sea water, with such a secured condition of the equipment being illustrated in FIGURE 2B; and in this condition, protective covers or casings encase apparatus which may be subject to corrosion, e.g. the engine, rotary table, draw-works, crown and travelling blocks, deadline spool, and other equipment which may be carried by the rig for subsequent drilling operations. For such protection purposes, waterproof metallic covers such as 49 and 50 may be employed for certain of the apparatus mentioned previously, and a further waterproof metallic cover 51 may be provided to encase the rotary table.

The encasing procedure takes place after equipment has been installed, and when the platform is to be submerged for purposes to be described, or when the entire rig is to be towed with equipment thereon. A typical encasing procedure, under such circumstances, contemplates that the crown block, to be employed during subsequent drilling operations, be removed from the top of the superstructure (to be described) and placed within an oil filled tank on the working platform 106 in the "two-block" position with the travelling block, whereafter this tank is filled with oil to protect the crown and travelling blocks from sea water corrosion. The storage tank for the crown and travelling block is preferably integrally connected to the deadline spool and draw-works on the working platform 106, to be described. In addition, during the securing of the equipment, the chain drive normally present between the engine and draw-works, etc. on said working platform may be removed to the tender; and all racked pipe is also removed. Other small or miscellaneous equipment subject to corrosion may be similarly removed to the tender. The waterproof metallic covers, such as 49 through 51 (see FIGURE 2B) are preferably evacuated to about 10 p.s.i. prior to sealing thereof, and tested for watertight integrity; whereafter the vacuum is released and the equipment sealed at normal atmospheric pressure.

With all racked pipe removed and the equipment so secured (assuming that there is equipment on the rig, which may not be the case), tanks 20a and 20b in main caisson 20 are flooded under the control of flood lines 30, 31 and valves 32, 33, or by the opening of any other appropriate valves which may be provided in the apparatus, and the entire rig is then lowered to the ocean bottom (see FIGURE 1C). Prior to such a lowering operation, the hydraulic lines associated with the various extensible masts are connected to a weight 52 which is in turn connected by a long lead line 53 (having a length in the order of 250 feet) to a buoy 54 adapted to float on the surface of the water. The line 53 and buoy 54 are provided to permit personnel on the tender to capture the hydraulic lines such as 44 after submersion and levelling operations are completed, whereby hydraulic pressure may be applied through said lines 44 from an oil supply and pumping arrangement preferably carried by the tender, thereby to permit the superstructure to be elevated.

It will be noted that when first lowered (see FIGURE 1C), the apparatus is probably not in a levelled condition due to irregularities on the ocean bottom; and accordingly, levelling operations should be conducted. As a matter of practice, and as will become apparent hereinafter, the superstructure may be partially extended after initial submersion so that the working platform is just above the water, whereafter levelling operations may take place at the same time that the equipment on the drilling platform is being installed or readied for subsequent use. Such levelling operations in the particular apparatus shown, are normally conducted with a diver, who opens a series of valves on the caisson head 24' and connects said valves to flexible lines extending to the tender and adapted to control jets of water through the jet feet 14 through 16. This valve and flexible line arrangement, used for levelling, is best shown in FIGURES 3 through 5.

In particular, each of the main bracing members 21, 22 and 23 (which may, as mentioned previously, be associated with auxiliary braces between these members and barge 10 and/or main caisson 20) is of hollow configuration defining a central fluid supply line 55 surrounded by an annular supply line 56. Central supply line 55 is connected at its upper end through a valve 57 to a flexible fluid line 58 which may extend to appropriate pumping equipment on the tender. Similarly, annular supply line 56 is connected through a further valve 59 to a still further flexible fluid line 60 which may also be so associated with pumping equipment. The double valve arrangement is, as illustrated in FIGURE 4, associated with each of the main support members 21, 22, 23, and in turn with each of the jet feet 14, 15, 16, thereby to permit independent control of jets of water at each of the three corners or apices of barge 10.

Central supply line 55 is connected at its lower end to the orifice 17 centrally located in the jet foot associated therewith. The annular line 56 is in turn connected to the circularly disposed orifices 18 in the same said jet foot. Once the valves 57 and 59 are opened, the amount of pressure applied to the various orifices 17 and 18 may be controlled from the tender to produce sequential or simultaneous streams of high pressure fluid, ejected through the jet feet into the subjacent surface to to effect variable erosion thereof.

When fully levelled, it is preferable that the jet feet be buried to substantially two-thirds of their height; and in practice, each of the jet feet 14, 15 and 16 exhibits a height in the order of six feet, whereby they are buried to at least four feet in the ocean bottom. These buried jet feet not only effect a desired levelling of the structure (by being buried to different appropriate depths), but also act as anchors to resist turning and shifting moments on the entire drilling structure, once drilling operations have commenced. Under ordinary practice, the anchors so provided will be sufficient; but they can be supplemented if desired by auxiliary standard anchors known to those skilled in the art.

Figure 2:
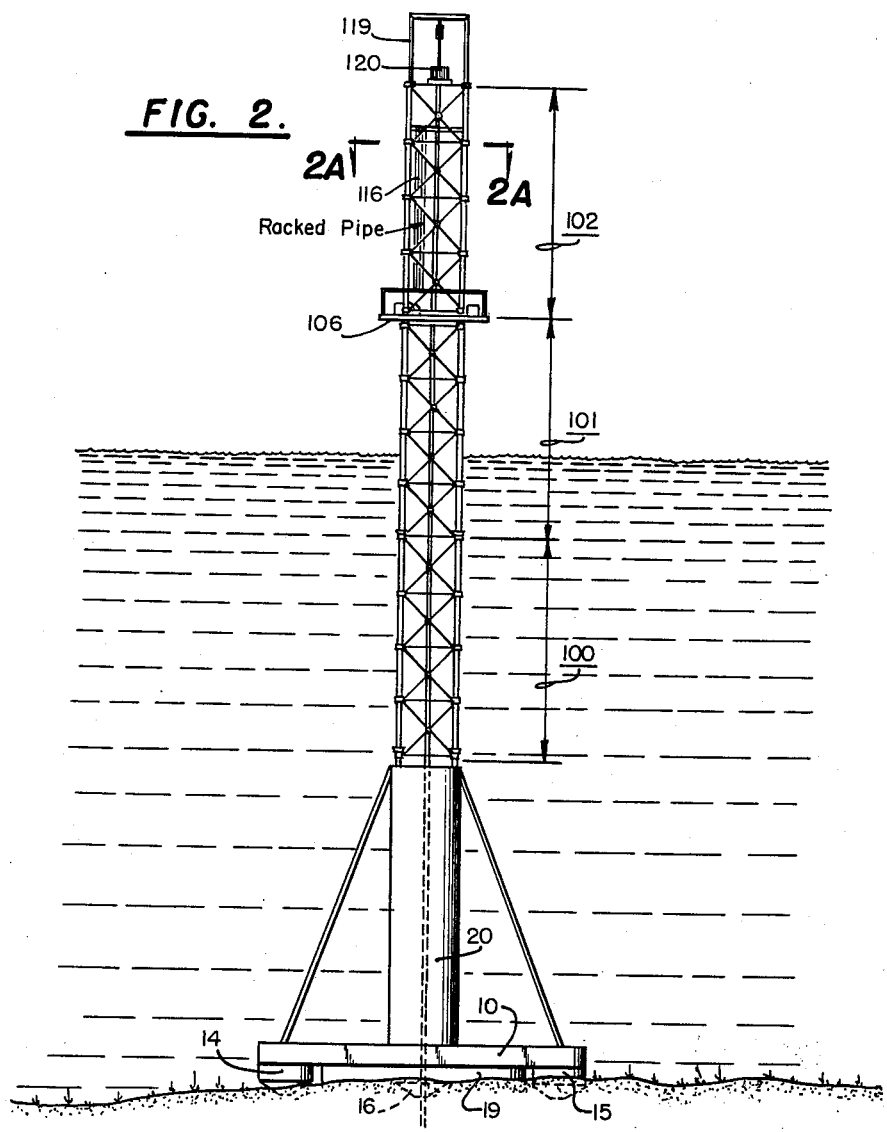
FIGURE 2 illustrates the apparatus of the present invention, levelled and with the superstructure extended for drilling operations.

The structure as leveled is illustrated in FIGURE 2, and it will be noted that the bottom surface of resilient hydraulic compensator or supporting structure 19 is now of irregular configuration fully conforming to the ocean bottom. This conformation is insured not only by the resilience of the material comprising hydraulic compensator, but by the fluid pressure therein; and the fluid filled compensator 19 thus provides a wide area base conforming exactly to the ocean bottom and adapted to give excellent support for the entire structure.

Examining now the collapsible superstructure which is one feature of the present invention, it will be recalled that this superstructure takes the form of telescopically arranged masts disposed in mast guide cylinders such as 39 and 40 within main caisson 20. The telescopically disposed masts are arranged in a triangular array (see FIGURE 4) whereby there are three such mast arrays designated 61, 62 and 63, combining to form an extensible superstructure which is of triangular cross-section having a width in the order of twelve feet on each side. A typical such mast array 61 is best illustrated in FIGURE 9; with this array being assumed to comprise the array located within mast guide cylinder 39.

Each mast array itself comprises a first extensible mast such as 64, having therein a second extensible mast such as 65, which in turn contains a third extensible mast such as 66. The innermost mast 66 has its top capped as at 67; and the three masts 64 through 66 are disposed in a lubricated slidably concentric arrangement, with appropriate seals being provided between the various mast sections and the guide cylinder 39 to prevent escape of fluid. Upon application of hydraulic pressure, the innermost mast 66 will tend to extend upwardly until a lower edge thereof bears upon an abutting shoulder forming an inner portion of mast 65. Continued application of pressure will thereafter cause masts 66 and 65 to extend outwardly simultaneously until further abutment is achieved between mast 65 and an abutting shoulder in mast 64, thereby to result in still further extension of mast 64. It will be appreciated therefore that, upon application of fluid pressure, a sequential extension of the masts occurs, with there being such an extension for each of the mast arrays 61, 62 and 63. Preferably the masts are extended under individual hydraulic controls in order to obviate problems of binding and the like, during the raising of the superstructure.

Each of the mast sections 64, 65 and 66 carries a fixed sleeve and a plurality of movable sleeves therebelow, with these sleeves being in turn associated with fixed and running girt members having collapsible X-bracing structures therebetween. By way of example, referring to FIGURES 8A, 8B and 9, it will be seen that the outermost telescoping mast section 64 has a fixed sleeve 69 welded thereto; and this same mast section 64 further includes four slidable sleeves 70 through 73, inclusive, therebelow. The intermediate mast section 65 similarly contains a fixed sleeve 74 and four slidable sleeves 75 through 78, inclusive, therebelow. The innermost mast section 66 also contains a fixed sleeve 79 and four further slidable sleeves therebelow.

A similarly such array of fixed and slidable sleeves is associated with each of the telescoping mast arrays 61, 62 and 63, and these sleeves are in turn interconnected by fixed and running girts connected respectively between the fixed and running or slidable sleeves, as well as by movable X-bracing members disposed between these running and fixed girts, all to provide substantial rigidity and to resist torque applied to the superstructure in its extended position.

One side of the array is shown in FIGURE 8A in its collapsed position, while one section of this same array is shown in its extended position in FIGURE 8B. Referring particularly to FIGURE 8B, it will be noted that the fixed sleeve 74 on mast 65 of telescoping section 61 has a complementary fixed sleeve 74a on the corresponding portion of the extensible mast section associated with telescoping section 62. These fixed sleeves 74 and 74a are interconnected by a fixed structural member or fixed girt 80. Similarly, the slidable sleeves 75, 76, 77 and 78 on mast 65 of telescoping mast section 61, have complementary sliding sleeves 75a through 78a inclusive, on the corresponding mast section associated with telescoping array 62. These slidable sleeves 75 through 78 and 75a through 78a are in turn interconnected by running girts 81 through 84 inclusive.

It will be noted that by this configuration, four generally rectangular sections are defined between the fixed sleeves on one mast section and the subjacent fixed sleeve on the next lower mast section; and each of these rectangular sections is further associated with a plurality of structural members forming a collapsible bracing of X configuration. A typical such bracing structure comprises four members 85 through 88 inclusive, having their inner ends pivotally connected to a plate 89 and having their outer ends connected to sleeve members such as 75, 75a and 76, 76a.

A typical member such as 85 and its interconnection to the remainder of the structure is best illustrated in FIGURES 10 and 11. In particular, each such member forming the X-bracing, such as 85, includes a hollow cylinder 90 which is preferably of hexagonal shape and which contains a piston structure therein comprising a hexagonal nut 91 thread engaging an elongated bolt 92 which in turn engages a bracket 93 at the junction of a girt member such as 81 and its adjacent sleeve such as 75. The outermost ends of each of the bracing structures such as 85 through 88 is so formed as a piston and cylinder; and similarly the inner ends of each said structure define such a piston and cylinder arrangement for engagement with the central plate such as 89. The area between the outer end of cylinder 90 and the adjacent regions of the sleeve and girt members is preferably covered by a waterproof sleeve 94 of resilient material such as rubber or plastic, whereby sea water is prevented from entering the interior of the several cylinders 90.

When the various mast members and their associated X-bracing are in a fully extended position, the several nuts 91 acting as pistons, closely conform to the inner hexagonal surfaces of cylinder 90 and abut upon the end walls thereof. Any looseness in this arrangement can be readily taken up by merely rotating the several cylinders such as 90 with a wrench or the like, whereby these cylinders act as turn-buckles to draw the members such as 85 through 88 into tension between the several outer sleeves such as 75, 75a and 76 and 76a and the inner plate 89. When the superstructure is collapsed on the other hand, the downward movement of the several sleeves surrounding the telescoping mast section causes the piston heads, e.g. 91, to be moved inwardly in their associated cylinders 90, thereby reducing the overall dimensions of the collapsible X-bracing and permitting the various fixed and running sleeves on the several mast sections to come into substantial abutment with one another.

It will be noted that the several X-bracing members thus described are not only interconnected between the fixed and running sleeves on given mast sections, but also extend between the different telescoping masts. In particular, as will be observed in FIGURE 8B, X-bracing is provided between the running sleeves 78, 78a on telescoping masts 65, 65a and the underlying fixed sleeves 69, 69a associated with outermost mast sections 64; and a similar arrangement also occurs between the fixed sleeves 64, 64a and the running sleeves above these fixed sleeves associated with mast section 66, 66a. As a result, when the masts are extended, the fixed sleeves 79 on the innermost masts are moved upward thereby pulling along their associated X-bracing members and causing an upward sliding movement of the slidable sleeves underlying the fixed sleeves 79 on mast section 66. This action continues until the mast 66 is fully extended, at which time X-bracing having a configuration similar to that shown in FIGURE 8B is effected; and the lowermost portion of this X-bracing is connected to the fixed sleeves such as 74 on the intermediate extensible mast 65. Further extension of the mast sections causes a similar operation to occur with the intermediate mast section 65, and thereafter with the outermost mast section 64, until the entire array is fully extended and assumes the configuration shown in FIGURE 2.

It should further be noted that, with the type of X-bracing contemplated by the present invention, one or more sections of the X-bracing may be removed to expose the interior of the superstructure. A given section comprising four members disposed in the X-configuration, can in fact be completely removed by the simple expedient of removing the four bolts associated with the corner brackets, such as 93. This removal technique is of special value since it permits pipe to be racked on the interior of the superstructure for use in subsequent drilling operations, as will be described hereinafter.

In order to protect the various mast sections from corrosive effects, a resilient protective casing of rubber or appropriate fouling resistent plastic material is provided This protective casing is best illustrated in FIGURES 9 and 10; and takes the form of resilient watertight sleeves of protective material extending between the various running and fixed sleeves on the extensible mast members to substantially completely encase the masts and their associated sleeves in a protective layer. By way of example, the sleeve 75 is associated with a pair of flexible protective sleeves 95 and 96 which are held on sleeve 75 by clamping rings 97 and 98, it being understood that similar such clamping rings are associated with the other ends of the sleeves 95 and 96 adjacent the overlying and underlying members 74 and 76 respectively. When the mast is in a collapsed position, the resilient casing takes a crumpled configuration as at 99 in FIGURE 9; and it will be understood that notwithstanding this crumpled configuration, full protection against corrosive effects is still provided.

The several mast sections, comprising four interconnected X-bracing sections, each exhibit a height in the order of ten feet in their collapsed configuration and a height in the order of fifty feet in their expanded configuration. For the particular arrangement shown in FIGURE 2, therefore, the central caisson 20, which may have a diameter in the order of thirteen feet and a height in the order of fifty feet, has superposed thereon three mast sections 100, 101 and 102, each of which, when fully extended, may exhibit a height in the order of fifty feet. The overall height of the structure above the upper deck of barge 10, in the particular embodiment actually illustrated, is therefore variable between substantially 80 feet and 200 feet. It will be appreciated, of course, that by increasing the number of telescoping mast sections associated with each mast, and/or by increasing the number of X-bracing sections associated with each mast section, the structure may be designed to extend to considerably greater heights than those mentioned, thereby permitting operation in even deeper waters; but for the figures actually given, the structure is adapted for most efficient operation in waters having a depth in the order of 150 feet.

It should moreover be appreciated that, while the several telescoping mast sections have been assumed to be equal in length, the lengths may in fact differ, e.g. mast guide cylinders 39 and 40 may be in the order of 60 feet in height, thereby actually extending above the top of caisson 20, and the outer, intermediate, and central telescoping masts can have different lengths, such as 60 feet, 70 feet, and 80 feet, respectively.

With the figures mentioned, and when operating in water depths of the type also mentioned, it will be noted that upon full collapse of the superstructure, the uppermost portion of the superstructure may be removed to a depth of substantially 60 feet below the water surface; and it has been found that submersion to a depth of this order obviates damaging effects produced by heavy wave action caused by sustained winds in excess of 50 knots. Moreover, although it is contemplated that in normal operation the mast sections are all fully extended, it may be noted that full extension is not necessary, and variable extension may be effected to provide operation in different water depths. In normal practice, the several mast sections are associated with slips mounted in slip hangers such as 103, 104, etc. (see FIGURE 8B) and these slips are designed to prevent undesired retraction of the mast once elevation thereof has been effected. The slips can be further associated with locking devices designed to prevent extension of given mast sections, or to prevent extension thereof beyond a given height.

It should further be noted that under some conditions, it may be desirable to extend some mast sections but not others. By way of example, when the structure is initially submerged, hydraulic pressure may thereafter be applied to elevate the mast structure preparatory to drilling operations. Since drilling equipment must be installed, or if already on the rig, must be removed from the protective housings therefor, some time is needed to ready the entire apparatus for drilling operations. It is therefore desirable to conduct such readying operations simultaneous with the levelling operations described previously. For this condition of operation, therefore, it is desirable to get the working platform 106 out of the water as quickly as possible; or, in the alternative, to extend the superstructure sufficiently to permit such a working platform to be installed. It is also preferable that the working platform represent the practical top of the structure during levelling operations in order that the overall device may exhibit a lower center of gravity during levelling thereof. To effect this purpose, it is normally desirable to provide cables such as 105 (see FIGURES 1A through 1C inclusive) between the upper and intermediate extensible sections, or, as illustrated, between the top of the extensible superstructure and the working platform 106; and these cables prevent the superstructure above the working platform position from being extended upon application of fluid pressure to the telescoping masts. As a result, two of the three extensible sections corresponding to sections 100 and 101, are initially elevated upon application of fluid pressure, whereafter, upon release of cables 105 and application of further fluid pressure, section 102 can be elevated, as necessary.

Figure 2A:
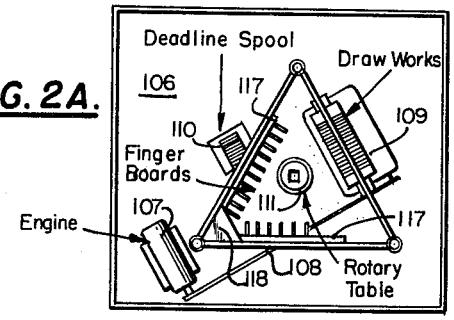
FIGURE 2A is a view taken on line 2A—2A of FIGURE 2.
Figure 2B:
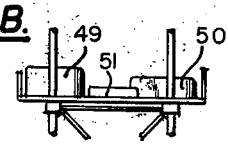
FIGURE 2B is an illustrative view on the working platform with equipment encased and protected thereon, as may occur during submersion of the superstructure.

The working platform 106 is, as illustrated in the several figures, connected at the top of the second extensible mast section. It may be permanently connected at this location, or in the alternative it may be arranged to be removably and/or variably connected to different portions of the mast sections. The working platform and support structure is designed to receive and support equipment useful in drilling. By way of example, as illustrated in FIGURE 2A, platform 106 may be designed to support an engine 107 connected by a chain drive 108 to a conventional draw-works 109; and a deadline spool 110 may also be provided, all of these elements being generally well known to those skilled in the art. A rotary table 111 may also be provided; but it will be appreciated that this rotary table may be dispensed with if turbo-drilling is employed; and similarly may be replaced by a power swivel when this latter type of equipment is employed for drilling operations.

It should further be noted that the particular type of hydraulically extensible structure contemplated by the present invention permits the draw-works 109 to be dispensed with under some conditions of operation, in particular when drilling with a turbo-drill or with a power swivel. In this regard the extensible mast section 102, positioned above the drilling platform 106, can actually be employed as a hydraulic hoist system for pulling pipe sections or the like. When so employed, the uppermost section 102 need merely be lowered under appropriate hydraulic control, whereafter the pipe to be pulled can be firmly attached to the retracted superstructure, and the superstructure then hydraulically lifted. When the superstructure is employed in such a hydraulic hoisting arrangement, variable loads may be imposed upon the base of the entire apparatus; and the hydraulic compensator or resilient base structure 19, mentioned previously, becomes particularly valuable during such hydraulic lifting operations. In this regard, it is particularly contemplated, in accordance with a preferred embodiment of the present invention, that the interior pressure in hydraulic compensator 19 can be varied to take care of variable loads on the overall structure; and by way of example, the hydraulic pressure within compensator 19 can be increased as pipe sections are withdrawn, utilizing the uppermost extensible masts as a hydraulic hoist system.

In order to effect this variable pressure within compensator 19, the compensator fill line 24, mentioned previously, is connected in the region of the working platform 106 (see FIGURE 7) through a flexbile hose 112 and movable piping arrangement 113 to a valve 114 and water supply associated therewith. Water passing from said water supply through valve 114 and hose 112 is adapted to then flow through compensator fill line 24 until the compensator and its associated fill line is filled with fluid to a height comprising the junction of fill line 24 and tubing 112. A continuous supply of water is preferably provided, with overflow passing over the top of this junction through an overflow or spill pipe 115.

It will be appreciated that by this arrangement the actual pressure of fluid within hydraulic compensator 19 is determined by the fluid head between said compensator 19 and the junction of lines 24 and 112. The pressure may be decreased by lowering compensator fill line 24, thereby to decrease the head; or in the alternative, may be increased by raising compensator fill line 24, thereby to increase the head. Accordingly, the compensator fill line is adapted to movable to various heights within a range of substantially ten feet to thirty feet above the water line, thereby to give corresponding variable pressures in compensator 19. The pressure may be varied as desired under different operating conditions; and can in fact be automatically controllable through an appropriate servo-system responsive to changes in load on the entire rig. Possible inputs to such a servo-system may be derived, for example, from the deadline spool 110, and the draw-works 109, mentioned previously, which normally include means giving a variable output with variations in tension on the line; and, indeed, it is conventional to have such information already available at the driller's control stand, such information normally being provided for monitoring purposes.

As mentioned previously, drill pipe used during normal operation of the rig is preferably racked within the braced superstructure of the apparatus in order to permit said pipe to be immediately available when needed. Such racked pipe is indicated at 116 in FIGURE 2; and the pipe is held in a racking platform comprising finger boards 117 provided with an appropriate operating platform 118 and connecting catwalks, all as illustrated in FIGURE 2A. In order to rack the pipe into finger boards 117, once the extensible superstructure is extended, one or more of the X-bracing sections described previously can be temporarily removed through the simple expedient of loosening the tension thereon through an appropriate turning of cylinders 90 acting as turn-buckles, and by thereafter removing the bolts at the ends of the several X-bracing members from their cooperating brackets 93. The pipe can then be racked through the use of an appropriate winch assembly, whereafter the removed X-bracing portions can be replaced and tightened into position.

The overall apparatus is, as illustrated in FIGURE 2, topped by a gin pole assembly 119 containing a crown block 120, all for purposes well known in the art. In addition, it will be appreciated that various other conventional structures may be employed in normal operation of the rig, including slips, blow-out preventers, pumps, measuring instruments, etc.; and detailed descriptions of these and other known forms of equipment finding utility in drilling operations of the type which may be employed with the present apparatus, will not be given since they are believed well known to those skilled in the art.

The overall structure can be made of considerably lighter structural materials and at considerably less expense than other forms of drilling devices, including submersible barges, suggested heretofore. The equipment can be towed to a desired drilling location, sunk, extended, and then employed in drilling techniques in a fairly short span of time; and when so employed the device provides a firm and level base for drilling operations as well as adequate structural strength to support all of the equipment and perform all the techniques normally necessary in offshore or marine drilling. The device is adapted to drill in good as well as in inclement weather; is adapted to stand-by in moderately heavy weather without submersion; and is adapted to avoid wave action and the stresses of heavy weather by being submerged below the level of effective wave action when such submersion becomes necessary. The submersion techniques, under conditions of impending heavy weather, are similar to those already described previously. All racked pipe and miscellaneous gear is removed, and various pieces of apparatus, e.g. the engine, rotary table, draw-works, crown and travelling blocks, and deadline spool, which may be subject to corrosion upon contact or extended contact with sea water, is appropriately prepared for such submersion by enclosure in protective housings. The majority of the drill pipe should also be removed prior to submerging in order to prevent sticking of the drill pipe. Thereafter the device may be lowered to a position wherein the uppermost portion of the superstructure is sufficiently below the wave action being avoided. After the heavy weather has passed, the buoy 54 (FIGURE 1C) can be snared and the hydraulic lines similar to 44 can then be recaptured by a hauling in of line 53, whereafter the device can be elevated and prepared for further drilling operations, all as described previously.

I claim:

1. A portable deep-water drilling platform comprising a fluid-filled base structure of hollow toroidal watertight configuration having a flexible bottom resting upon the ocean floor and being formed of a sufficiently resilient material to closely conform to irregularities in the ocean floor, a superstructure attached to said flexible-bottomed toroidal base and extending upwardly from said base to a position above the ocean surface and substantially aligned with the central hole of said toroidal base, drilling means attached to said superstructure for conducting drilling operations through the said central hole of said base structure, and means for varying the pressure of said fluid in said base structure with changes in load thereon during said drilling operations.

2. A portable deep water drilling platform comprising a movable base having downwardly extending supports adjacent the outer edges thereof, each said support defining at least one orifice on the underside thereof, means for applying fluid under pressure to said supports to effect jets of said fluid through said orifices adapted to erode an ocean floor upon which said base and supports rest thereby to level said base, said base including a watertight chamber on the underside thereof having a substantially flat bottom of sufficient resilience to closely conform to irregularities in the ocean floor and extending between said supports over the major area of said base underside, the resilient bottom of said structure being distorted into closely conforming engagement with said ocean floor during said levelling operations, said chamber being constructed to contain fluid under pressure.

3. The combination of claim 2 including means for displacing the fluid in said hollow structure with concrete thereby to convert said hollow structure into a semi-permanent foundation having the lower surface thereof permanently and firmly conforming to the underlying ocean floor.

4. A submersible platform comprising, a floatable barge, means for controlling the buoyancy of said barge to thereby permit said barge to be submerged at a desired location in a body of water, at least one base support for said barge extending from the bottom-most surface of said barge and comprising an enclosed watertight chamber having a substantially flat bottom formed of a material having sufficient resiliency to closely conform to irregularities in the sea bottom, means for filling said chamber with a fluid under pressure, and at least three supporting feet for said barge depending therefrom and extending downwardly below the bottom surface of said chamber, whereby when said barge is resting upon the sea bottom said chamber provides a large-area bearing surface in close conformity to the sea bottom and said depending feet become embedded in the sea bottom so as to provide resistance against turning moments applied to said barge both about horizontal and vertical axes.

5. The structure of claim 4 including means for varying the pressure of said fluid within said container.

6. The combination of claim 4 including an extensible superstructure attached to the upperside of said barge, said superstructure comprising three elongated masts extending upright from said barge in a triangular array, each said mast including a plurality of telescoping sections, a plurality of movable bracing elements extending between the sides of said triangular array, and fluid pressure control means for selectively extending said telescoping sections and for simultaneously moving said bracing elements thereby to effect an elongated braced triangular superstructure above said barge.

7. The combination of claim 6 including pipe racking means on the interior of said triangular superstructure, portions of said bracing elements being selectively detachable thereby to permit pipe to be racked onto said racking means subsequent to extension of said superstructure.

8. A deep-water submersible drilling platform comprising a floatable barge having a resilient-bottomed enclosure on the underside thereof, said barge including tank means for controlling the buoyancy thereof whereby said barge may be submerged at a desired location thereby to place the resilient bottom of said enclosure into closely conforming engagement with the ocean bottom at said desired location, said enclosure being constructed to contain fluid under pressure, means for filling said resilient-bottomed container with a fluid whereby the pressure of said fluid within said container resists loads imposed upon said platform, said tank means including an elongated generally cylindrical caisson extending upright from the upper side of said barge, a plurality of telescoping extensible masts extending from said barge upwardly through said caisson, said mast supporting a work platform thereon at a position above and initially adjacent to the upper end of said caisson, and fluid pressure control means for extending said masts thereby to elevate said work platform to a position appreciably above the upper end of said caisson and above the water surface.

9. A deep-water drilling platform comprising a flexible fluid-filled container being constructed to contain fluid under pressure and resiliently conforming to an ocean floor, structural means attached to said flexible container for supporting a superstructure above said fluid-filled container, said superstructure including a plurality of retractable members projecting from said structural means to a position above the ocean surface during normal drilling operations, means for retracting said members under heavy weather conditions to a position wherein the uppermost portions of said superstructure are submerged to a water level below effective wave action at said ocean surface, said structural means comprising a structural base of generally triangularly configuration overlying said fluid-filled container and a plurality of supporting feet extending downwardly from the apices of said triangular configuration along the outer sides of said container and into contact with said ocean floor, said flexible fluid-filled container being of generally toroidal configuration, said overlying structural base including an opening substantially aligned with the central hole of said toroidal container whereby drilling operation may be conducted from said superstructure through both said structural base and toroidal container.

10. A submersible platform comprising, a floatable barge, means for controlling the buoyancy of said barge to thereby permit said barge to be submerged at a desired location in a body of water, at least one base support for said barge extending from the bottom-most surface of said barge and comprising an enclosed watertight chamber having a substantially flat bottom formed of a material having sufficient resiliency to closely conform to irregularities in the sea bottom, means for filling said chamber with a fluid under pressure, whereby the pressure of said fluid within said chamber resists loads imposed upon said platform, said tank means including an elongated generally cylindrical caisson extending upright from the upper side of said barge, a plurality of telescoping extensible masts extending from said barge upwardly through said caisson, said masts supporting a work platform thereon at a position above and initially adjacent to the upper end of said caisson, and fluid pressure control means for extending said masts thereby to elevate said work platform to a position appreciably above the upper end of said caisson and above the water surface and to lower said platform below the level of destructive wave action as desired.

11. The combination of claim 10 wherein said telescoping masts include plural extensible portions, and means for selectively preventing extension of some said portions while permitting extension of others of said portions.

12. The combination of claim 10 wherein said telescoping masts include extensible portions both above and below said work platform, and means for preventing extension of said portions above said work platform until said work platform is moved above said water surface by extension of said mast portions below said work platform.

13. A deepwater drilling platform comprising a flexible, watertight fluid-filled container resiliently conforming to an ocean floor, structural means attached to said flexible container for supporting a superstructure above said fluid-filled container, said structural means comprising a structural base of generally triangular configuration overlying said fluid-filled container, said superstructure including a plurality of retractable members projecting from said structural means to a position above the ocean surface during normal drilling operations, means for retracting said members under heavy weather conditions to a position wherein the uppermost portions of said superstructure are submerged to a water level below effective wave action and said ocean surface, and a plurality of supporting feet extending downwardly from the apices of said triangular configuration along the outer sides of said container and into contact with said ocean floor.

References Cited in the file of this patent

UNITED STATES PATENTS

| | | |
|---|---|---|
| 2,580,911 | Harris | Jan. 1, 1952 |
| 2,600,761 | Halliburton | June 17, 1952 |
| 2,661,600 | Hopkins | Dec. 8, 1953 |
| 2,667,038 | Bayley | Jan. 26, 1954 |
| 2,714,011 | Albee | July 26, 1955 |
| 2,724,156 | Shaw | Nov. 22, 1955 |
| 2,763,339 | North | Sept. 18, 1956 |
| 2,767,812 | Boger | Oct. 23, 1956 |
| 2,772,539 | Sandberg | Dec. 4, 1956 |
| 2,774,218 | Hazak | Dec. 18, 1956 |
| 2,826,280 | Troche et al. | Mar. 11, 1958 |
| 2,837,897 | Nedderman | June 10, 1958 |
| 2,877,629 | De Long | Mar. 17, 1959 |
| 2,908,141 | Marsh | Oct. 13, 1959 |
| 2,913,880 | Rechtin et al. | Nov. 24, 1959 |
| 2,990,166 | Walsh | June 27, 1961 |